(12) United States Patent
Thomas et al.

(10) Patent No.: US 12,386,932 B2
(45) Date of Patent: Aug. 12, 2025

(54) SYSTEMS, METHODS, AND APPARATUSES FOR DETECTING USER ACCOUNT MISAPPROPRIATION ATTEMPTS USING ARTIFICIAL INTELLIGENCE IN AN ELECTRONIC NETWORK

(71) Applicant: BANK OF AMERICA CORPORATION, Charlotte, NC (US)

(72) Inventors: Allwin Thomas, Chennai (IN); Durgesh Singh Yadav, Gautam Buddha Nagar (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 222 days.

(21) Appl. No.: 18/218,244

(22) Filed: Jul. 5, 2023

(65) Prior Publication Data
US 2025/0013724 A1    Jan. 9, 2025

(51) Int. Cl.
*G06F 21/31* (2013.01)
*G06F 21/62* (2013.01)

(52) U.S. Cl.
CPC ........ *G06F 21/316* (2013.01); *G06F 21/6218* (2013.01); *G06F 2221/2101* (2013.01); *G06F 2221/2141* (2013.01)

(58) Field of Classification Search
CPC .............. G06F 21/316; G06F 21/6218; G06F 2221/2101; G06F 2221/2141
See application file for complete search history.

(56) References Cited

U.S. PATENT DOCUMENTS

| | | | |
|---|---|---|---|
| 6,658,393 B1 | 12/2003 | Basch |
| 7,765,481 B2 | 7/2010 | Dixon |
| 8,484,700 B2 | 7/2013 | Hulten |
| 9,536,072 B2 | 1/2017 | Guedalia |
| 9,679,125 B2 | 6/2017 | Bailor |
| 10,482,395 B2 | 11/2019 | Sadaghiani |
| 10,977,654 B2 | 4/2021 | Kumar |
| 10,992,763 B2 | 4/2021 | Kursun |
| 11,062,316 B2 | 7/2021 | Bizarro |

(Continued)

FOREIGN PATENT DOCUMENTS

EP    2922268 A1    9/2015

*Primary Examiner* — Han Yang
(74) *Attorney, Agent, or Firm* — Moore & Van Allen PLLC; Lauren M. Stokes

(57) ABSTRACT

Systems, computer program products, and methods are described herein for detecting user account misappropriation attempts using artificial intelligence (AI) in an electronic network. The present invention is configured to access a user account database, wherein the user account database comprises at least one user account data; identify a current data transmission associated with a user account, wherein the user account is associated with the user account database; apply the current data transmission to a user account misappropriation AI engine; determine, by the user account misappropriation AI engine, a misappropriation likelihood of the current data transmission; generate a user account report based on the current data transmission and the misappropriation likelihood, the user account report comprising a user account identifier associated with the user account; and generate, based on the misappropriation likelihood, a misappropriation attempt attribute for the current data transmission.

20 Claims, 8 Drawing Sheets

(56) References Cited

U.S. PATENT DOCUMENTS

| | | |
|---|---|---|
| 11,520,922 B2 | 12/2022 | Marlin |
| 11,645,711 B2 | 5/2023 | Anasta |
| 11,968,130 B2 * | 4/2024 | Dintenfass ......... G06Q 30/0201 |
| 12,248,606 B2 * | 3/2025 | Landy ................... G06F 21/604 |
| 2003/0069820 A1 | 4/2003 | Hillmer |
| 2010/0280927 A1 | 11/2010 | Faith |
| 2019/0213498 A1 | 7/2019 | Adjaoute |
| 2019/0213595 A1 | 7/2019 | Sadaghiani |
| 2020/0204524 A1 | 6/2020 | Simons |
| 2021/0174366 A1 | 6/2021 | Zeng |
| 2021/0202106 A1 | 7/2021 | Bostic |
| 2022/0050921 A1 | 2/2022 | LaFever |
| 2024/0048506 A1 * | 2/2024 | Baransky .............. H04L 47/722 |
| 2024/0155000 A1 * | 5/2024 | Kim .................... H04L 63/1416 |
| 2024/0370554 A1 * | 11/2024 | Williams ............. G06F 21/554 |
| 2025/0007940 A1 * | 1/2025 | Philip ................ G06Q 10/0635 |
| 2025/0094856 A1 * | 3/2025 | Verma ................... G06N 20/00 |

* cited by examiner

SYSTEMS, METHODS, AND APPARATUSES FOR DETECTING USER ACCOUNT MISAPPROPRIATION ATTEMPTS USING ARTIFICIAL INTELLIGENCE IN AN ELECTRONIC NETWORK

FIELD OF THE INVENTION

The present invention embraces a system for detecting user account misappropriation attempts using artificial intelligence (AI) in an electronic network.

BACKGROUND

Electronic networks have more data transmission requests being input to their systems than ever before, and some of those data transmission requests may comprise false or misappropriation attempts to collect data without the proper authorization. Thus, there exists a need for a system to accurately, efficiently, securely, and dynamically determine misappropriation attempts for data transmission requests, without undue hardship on computing systems, undue hardship by receiving manual input for each data transmission request, and an undue waste of time in identifying the misappropriation attempts.

Applicant has identified a number of deficiencies and problems associated with for detecting user account misappropriation attempts using artificial intelligence (AI) in an electronic network. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for detecting user account misappropriation attempts using artificial intelligence (AI) in an electronic network is provided. In some embodiments, the system may comprise: a memory device with computer-readable program code stored thereon; at least one processing device, wherein executing the computer-readable code is configured to cause the at least one processing device to perform the following operations: access a user account database, wherein the user account database comprises at least one user account data; identify a current data transmission associated with a user account, wherein the user account is associated with the user account database; apply the current data transmission to a user account misappropriation AI engine; determine, by the user account misappropriation AI engine, a misappropriation likelihood of the current data transmission; generate a user account report based on the current data transmission and the misappropriation likelihood, the user account report comprising a user account identifier associated with the user account; and generate, based on the misappropriation likelihood, a misappropriation attempt attribute for the current data transmission.

In some embodiments, the computer-readable code may further be configured to cause the at least one processing device to perform the following operations: determine the misappropriation likelihood for the current data transmission, wherein the misappropriation likelihood comprises a misappropriation score; identify a misappropriation attempt threshold; and generate a misappropriation attempt attribute for the current data transmission, wherein, in an instance where the misappropriation score meets or exceeds the misappropriation attempt threshold, generate a positive misappropriation attempt attribute for the current data transmission, or wherein, in an instance where the misappropriation score is less than the misappropriation attempt threshold, generate a negative misappropriation attempt attribute for the current data transmission. In some embodiments, the computer-readable code may further be configured to cause the at least one processing device to perform the following operations: update, based on the misappropriation attempt attribute, the user account report with the misappropriation attempt attribute for the current data transmission; and apply, based on updating the user account report, the user account report to the user account misappropriation AI engine. In some embodiments, the computer-readable code may further be configured to cause the at least one processing device to perform the following operation: transmit, based on the generation of the positive misappropriation attempt attribute, an updated authentication requirement to a user device associated with the current data transmission.

In some embodiments, the user account data comprises at least one of a current resource transmission data or a historical resource transmission data. In some embodiments, the current resource transmission data or the historical resource transmission data comprises at least one of a resource transmission recipient identifier, a resource transmission sender identifier, a resource amount attribute, a resource transmission sender location identifier, a resource transmission recipient location identifier, or a resource transmission channel attribute. In some embodiments, the user account report comprises at least one of the resource transmission recipient identifier, the resource transmission sender identifier, the resource amount attribute, the resource transmission sender location identifier, the resource transmission recipient location identifier, a frequency of resource transmissions attribute associated with the user account, or a resource transmissions channel attributes. In some embodiments, the resource transmission sender location identifier or the resource transmission recipient location identifier is based on at least one of a geolocation of a user associated with the user account or a historical geolocation data associated with the user account.

In some embodiments, the user account misappropriation AI engine comprises an adaptive engine.

In some embodiments, the computer-readable code may further be configured to cause the at least one processing device to perform the following operations: identify the current data transmission is associated with a new user account; identify at least one entity parameter, wherein the at least one entity parameter is associated with an entity associated with the user account; compare, by the user account misappropriation AI engine, the at least one entity parameter and the current data transmission; and determine, based on the comparison of the at least one entity parameter and the current data transmission, the misappropriation likelihood of the current data transmission.

In some embodiments, the computer-readable code may further be configured to cause the at least one processing device to perform the following operations: generate, based on the misappropriation likelihood, a misappropriation likelihood interface component comprising the misappropriation likelihood, the current data transmission, and the user account identifier; and transmit the misappropriation likelihood interface component to a user device associated with the user account, wherein the misappropriation likelihood interface component configures a graphical user interface of the user device.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
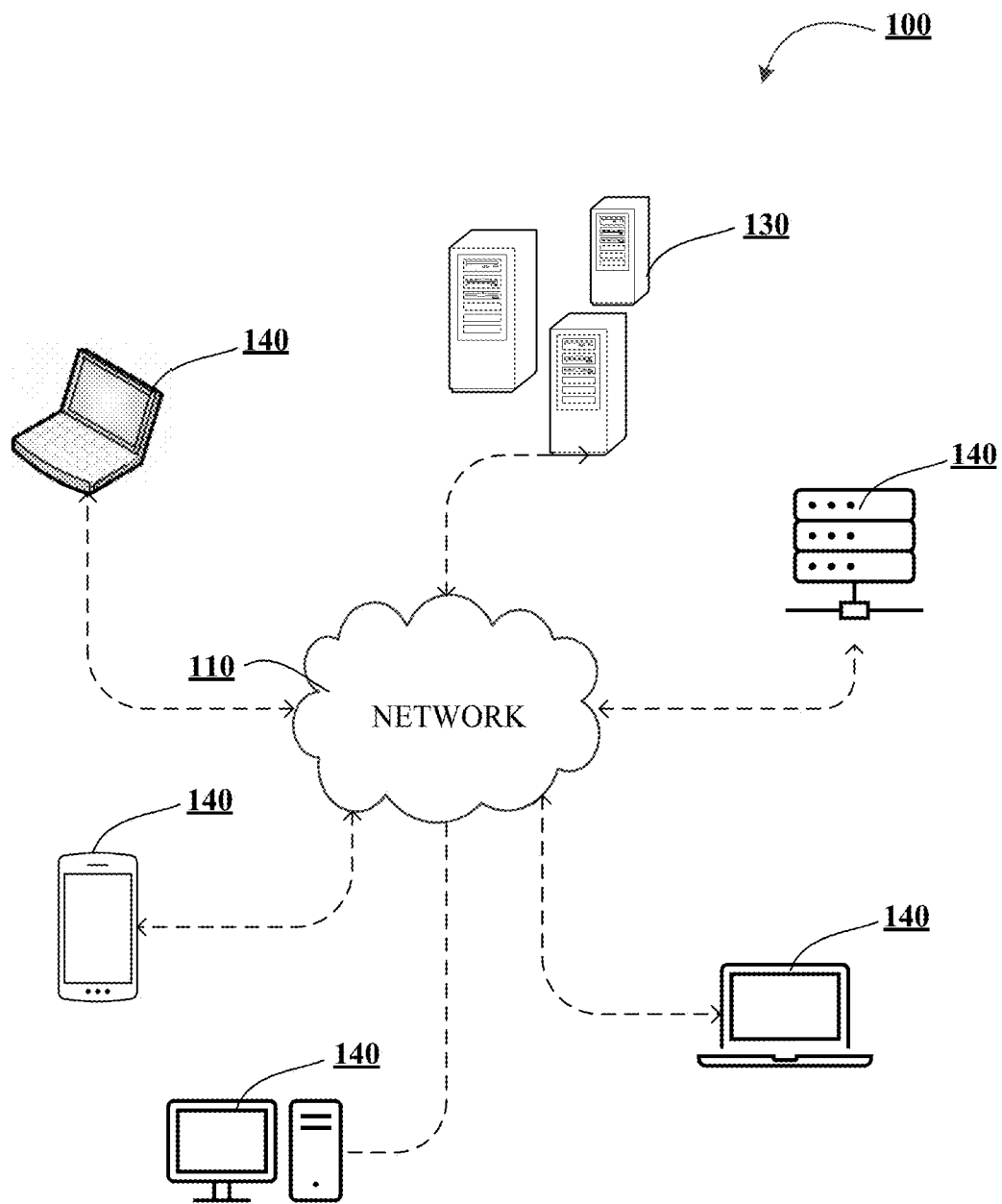
Figure 1B:
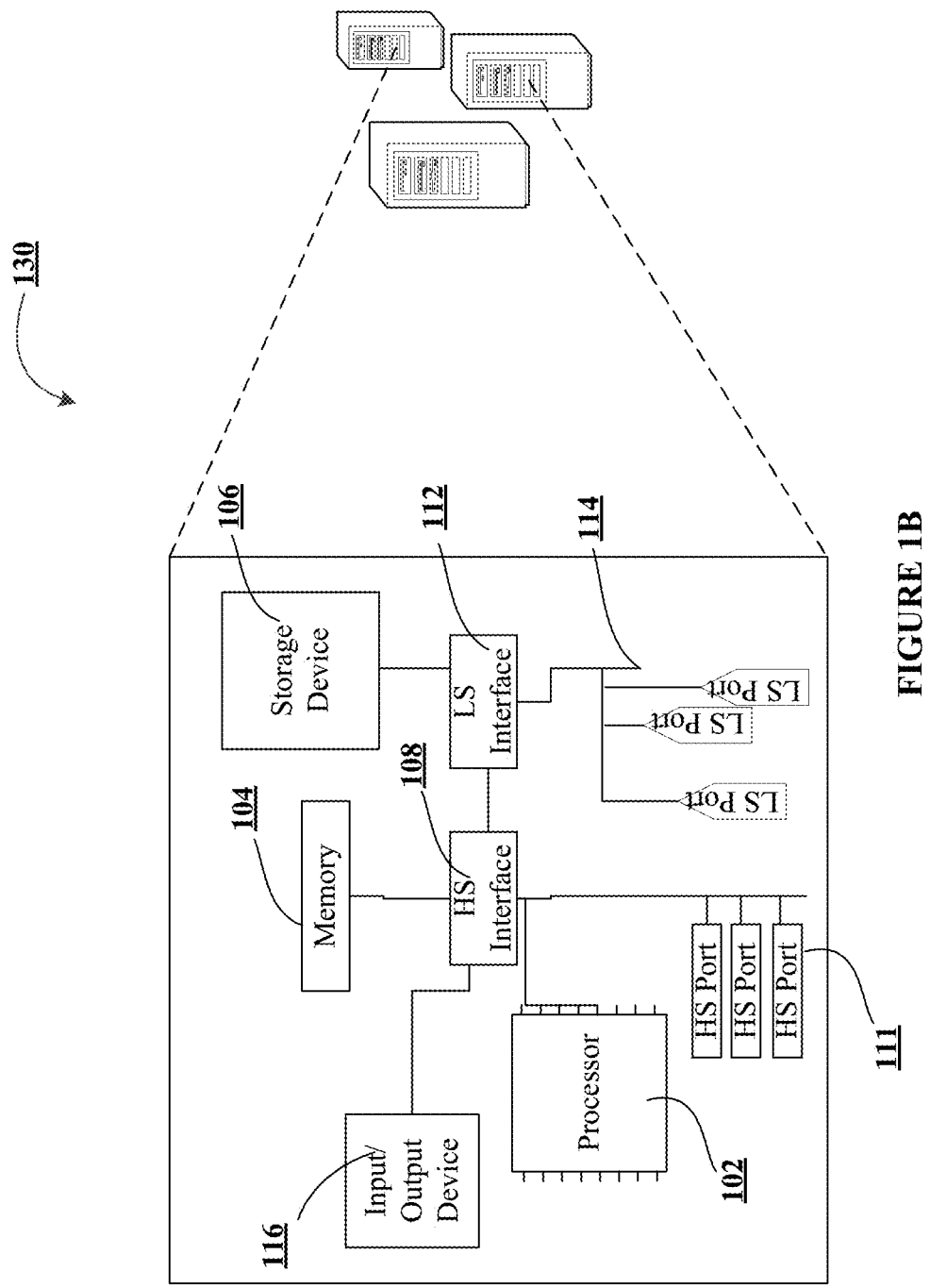
Figure 1C:
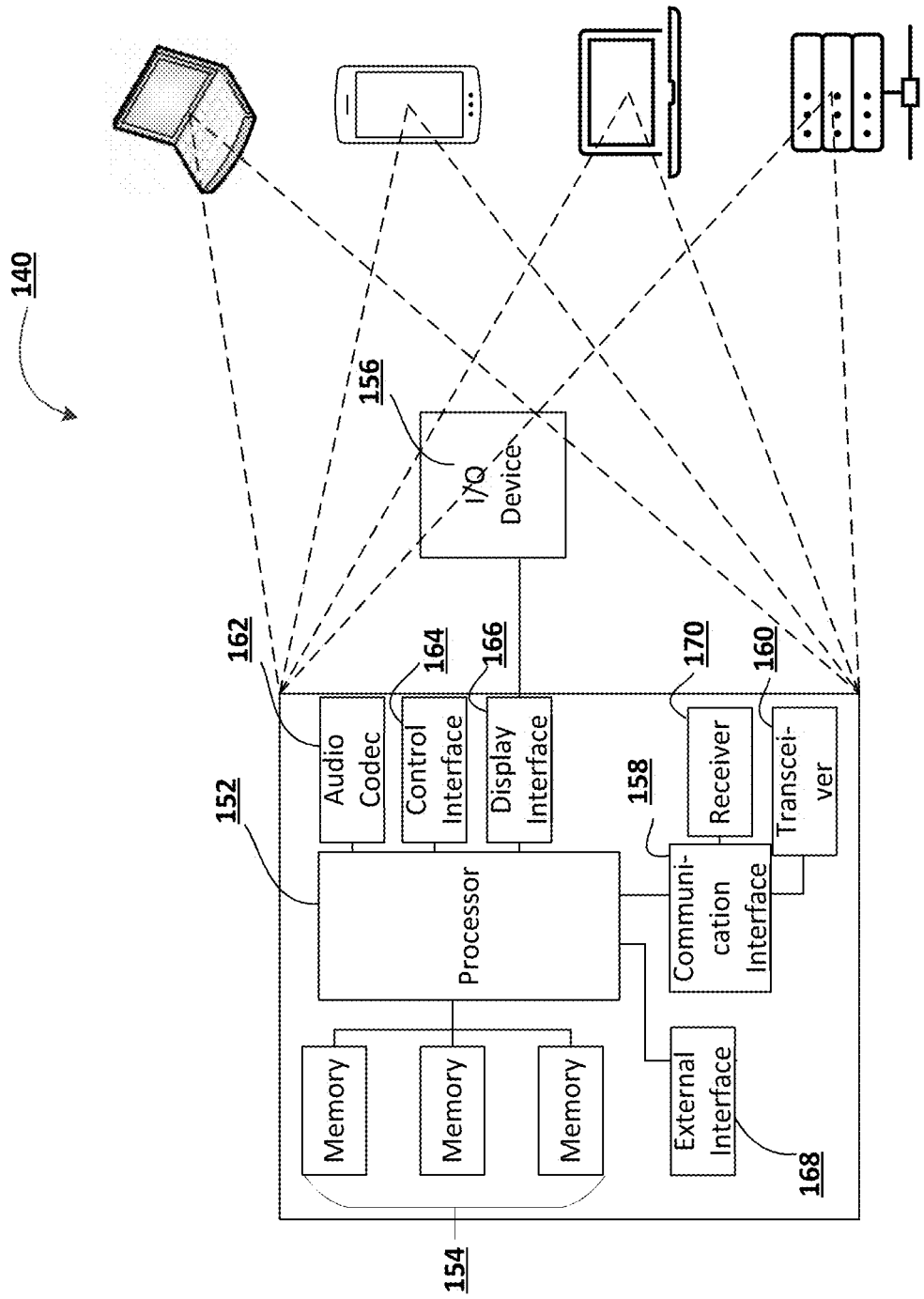
Figure 2:
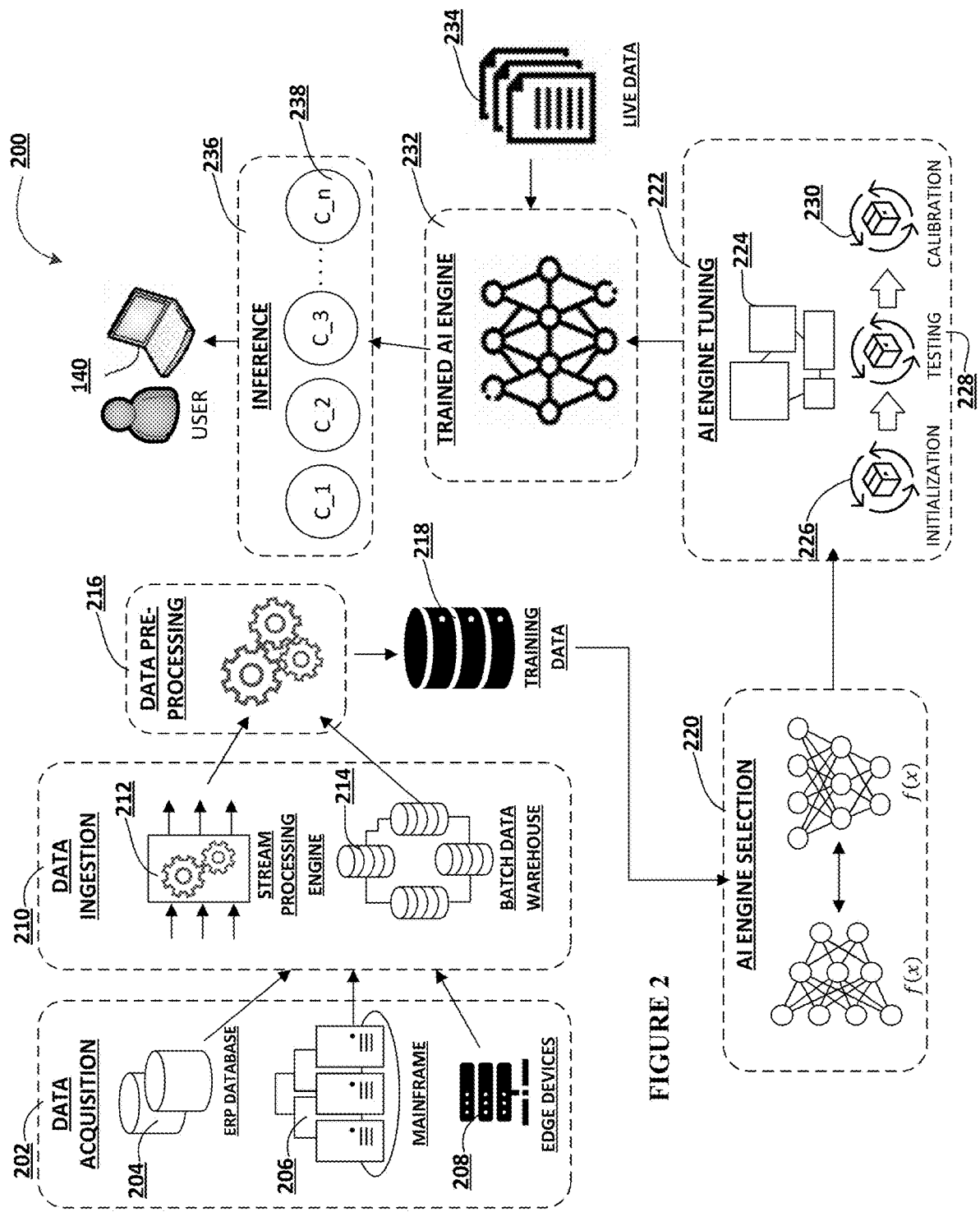
Figure 3:
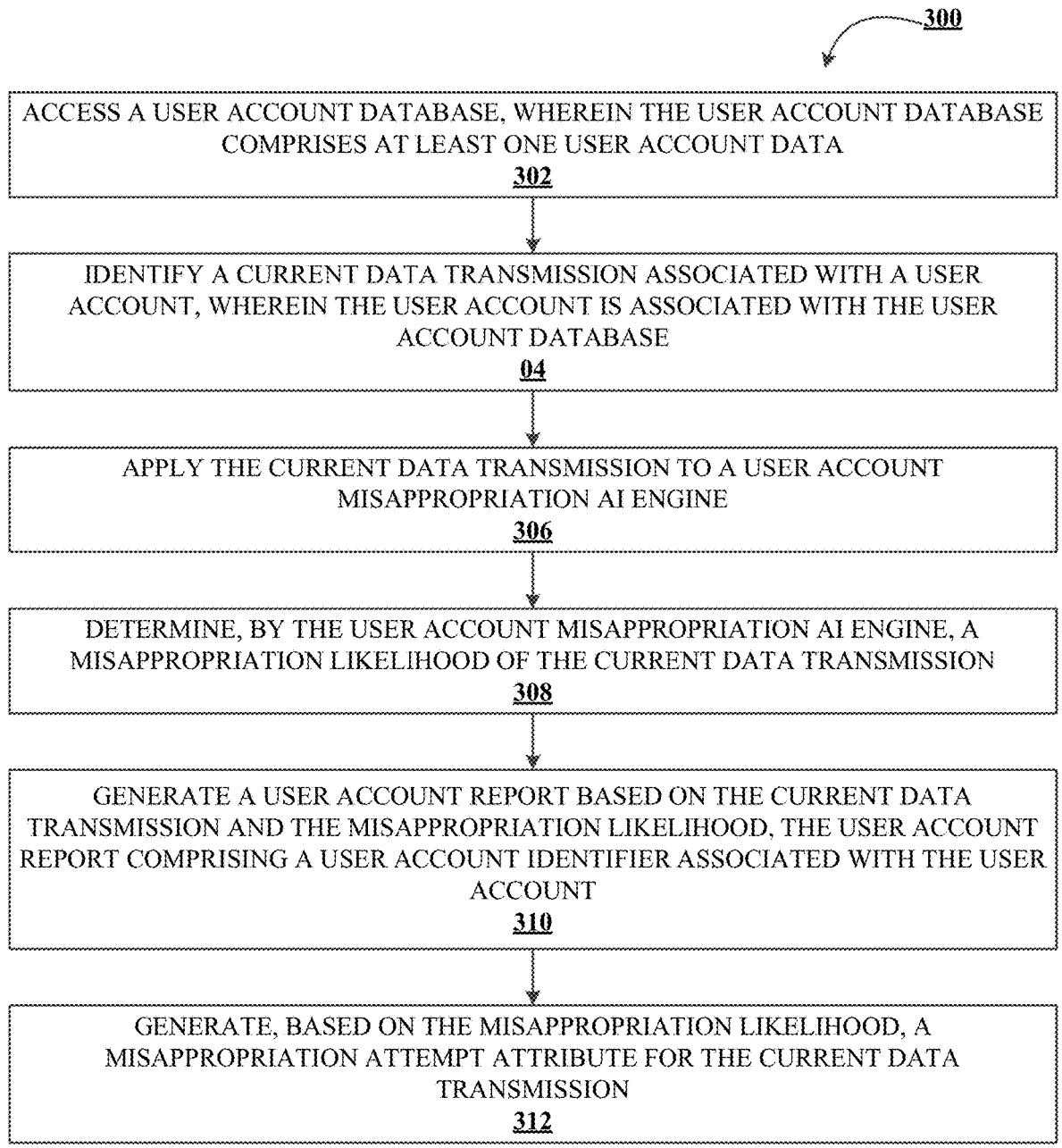
Figure 4:
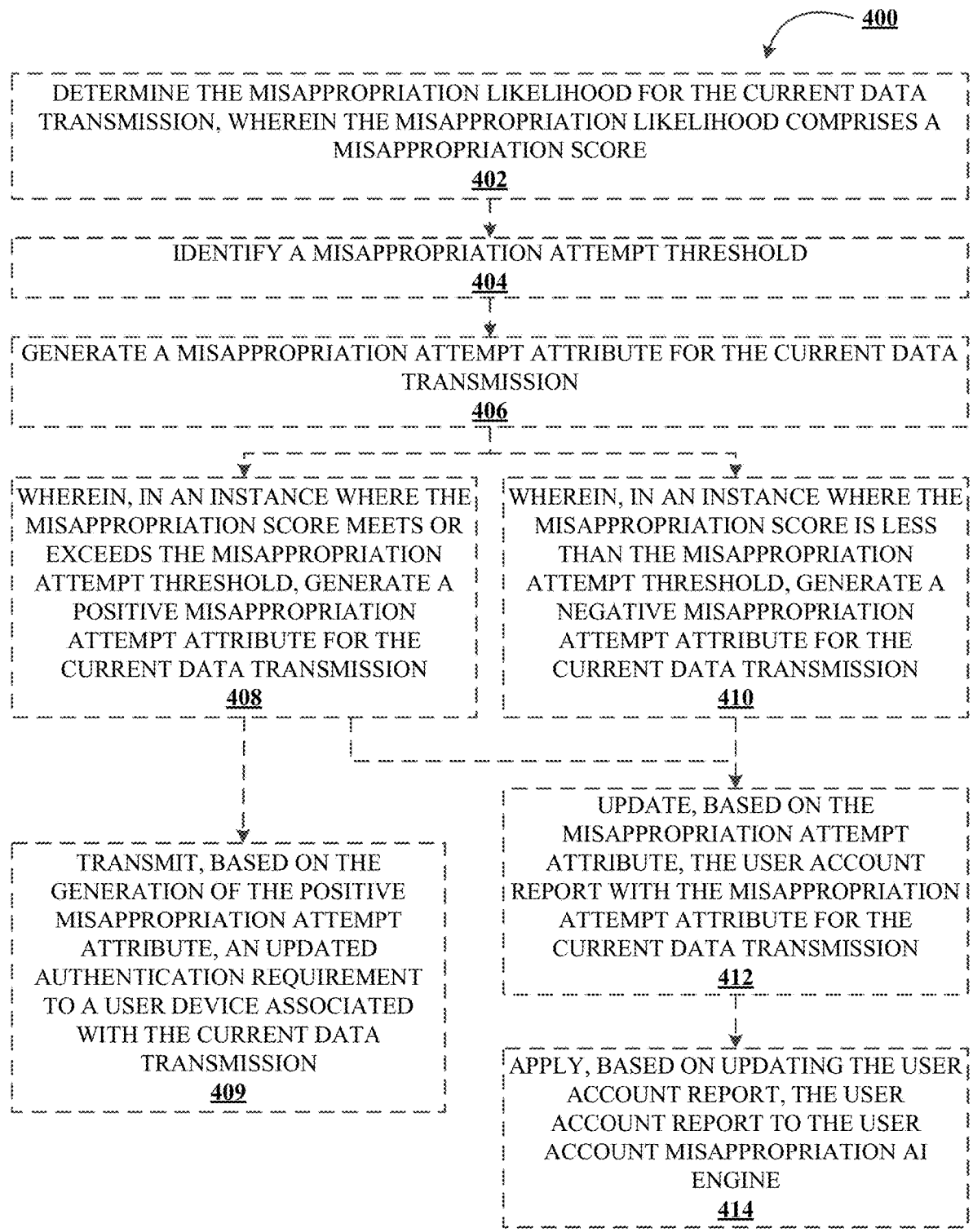
Figure 5:
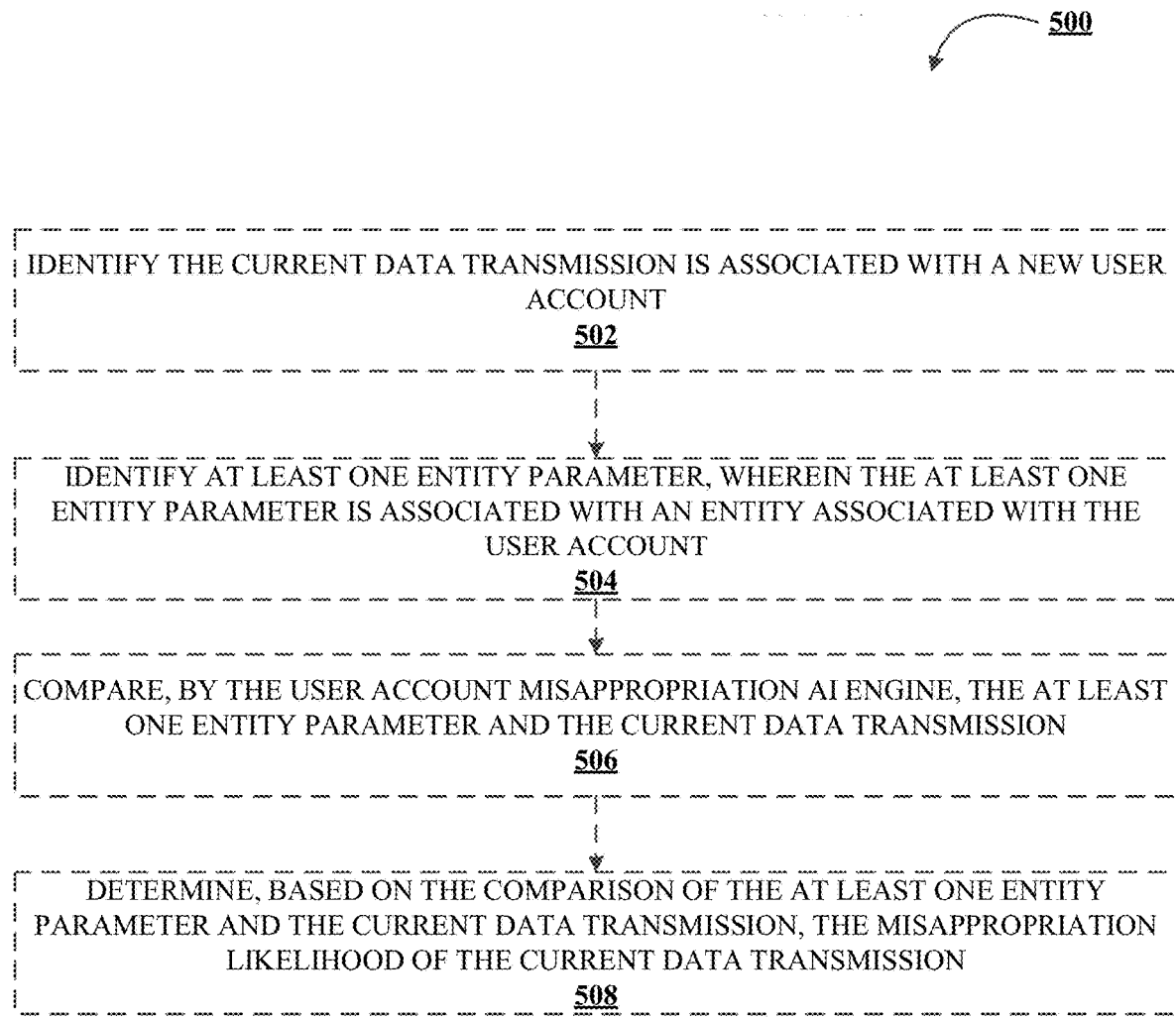
Figure 6:
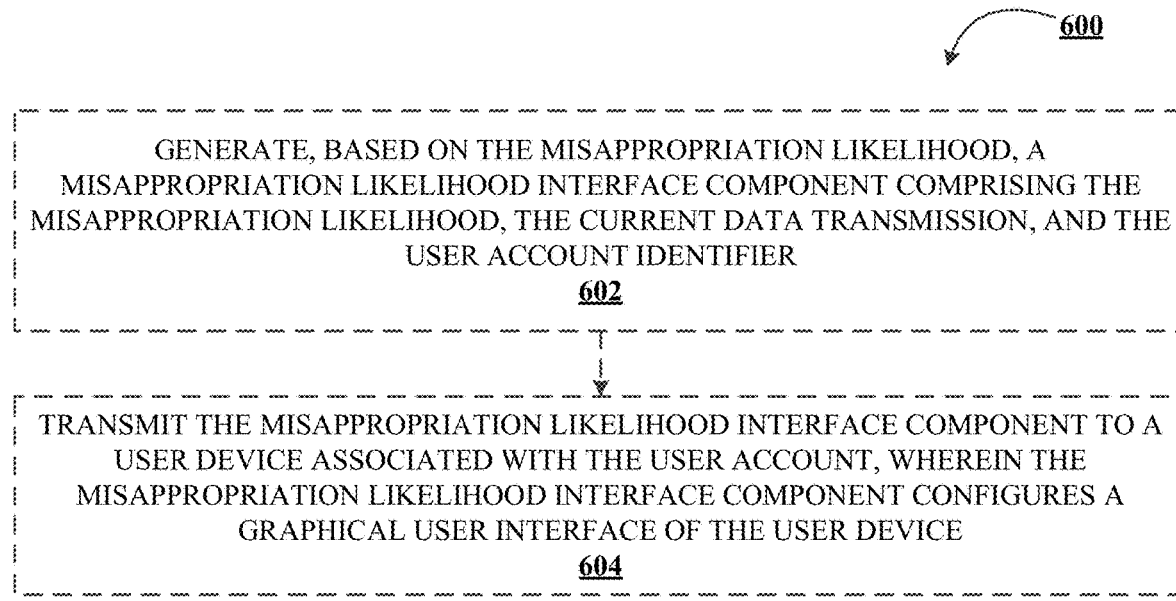

Having thus described embodiments of the invention in general terms, reference will now be made the accompanying drawings, wherein:

FIGS. 1A-1C illustrates technical components of an exemplary distributed computing environment for detecting user account misappropriation attempts using artificial intelligence (AI) in an electronic network, in accordance with an embodiment of the disclosure;

FIG. 2 illustrates technical components of an exemplary artificial intelligence (AI) subsystem, in accordance with an embodiment of the disclosure;

FIG. 3 illustrates a process flow for detecting user account misappropriation attempts using artificial intelligence (AI) in an electronic network, in accordance with an embodiment of the disclosure;

FIG. 4 illustrates a process flow for generating a misappropriation attempt attribute for the current data transmission, in accordance with an embodiment of the disclosure;

FIG. 5 illustrates a process flow for determining the misappropriation likelihood of the current data transmission, in accordance with an embodiment of the disclosure; and FIG. 6 illustrates a process flow for transmitting the misappropriation likelihood interface component to a user device, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource distribution," "resource transmission," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As discussed briefly above, electronic networks have more data transmission requests being input to their systems than ever before, and some of these data transmission requests may comprise false or misappropriation attempts to collect data without proper authorization. Thus, there exists a need for a system to accurately, efficiently, securely, and dynamically determine misappropriation attempts for data transmission requests, without undue hardship on computing systems, undue hardship by receiving manual input for each data transmission request, and an undue waste of time in identifying the misappropriation attempts. For example, and when a data transmission request comprises a request for a resource transmission to occur within a distributed network, the data security issue is exacerbated as not only data may be misappropriated, but resources as well. Such a solution to this widespread computing problem may be found in the data misappropriation identification system described herein.

Accordingly, the present disclosure provides a system, method, and apparatus for detecting user account misappropriation attempts using artificial intelligence (AI) in an electronic network. For instance, a system (like that data misappropriation identification system described herein] may comprise: a memory device with computer-readable program code stored thereon; at least one processing device, wherein executing the computer-readable code is configured to cause the at least one processing device to perform the following operations: access a user account database, wherein the user account database comprises at least one user account data (e.g., user account identifiers and associated data transmissions, including but not limited historical and current resource transmissions and requests); identify a current data transmission (e.g., a current data transmission request, such as a current resource transmission request) associated with a user account, wherein the user account is associated with the user account database; and apply the current data transmission to a user account misappropriation AI engine. Further, the data misappropriation identification system may be configured to: determine, by the user account misappropriation AI engine, a misappropriation likelihood (e.g., whether the current data transmission comprises a misappropriation attempt) of the current data transmission; generate a user account report based on the current data transmission and the misappropriation likelihood, the user account report comprising a user account identifier associated with the user account; and generate, based on the misappropriation likelihood, a misappropriation attempt attribute for the current data transmission.

Thus, and in general, the data misappropriation identification system described herein may be configured to efficiently, accurately, securely, and dynamically determine whether data transmissions comprise misappropriation attempts, generate and/or update user account reports with this determination, and generate a misappropriation attempt attribute which may be linked within a user account database for future searching and training. Further, and in some embodiments, the user account report generated by the data misappropriation identification system may additionally be transmitted to a user device, such as a user device associated with the user account of the current data transmission, a user device of a client of the data misappropriation identification system, a user device of a manager of the data misappropriation identification system, and/or the like, and used to configure a GUI of the user device(s). In this manner, and upon generating or updating the user account report, the user account report may be directly transmitted to the proper user device for rendering, such that the correct user is able to view and/or approve/disapprove of the latest misappropriation attempt attribute/likelihood.

What is more, the present invention provides a technical solution to a technical problem. As described herein, the technical problem includes the accurate and efficient determination of misappropriation attempts for electronic data transmissions and data transmission requests, without undue hardship on computing components and systems, and without undue delay. The technical solution presented herein allows for a data misappropriation identification system, like that described herein, to accurately, efficiently, securely, and dynamically determine and identify misappropriation attempts for data transmissions in an electronic network, such as a distributed network where many data transmissions are identified and collected every second, hour, and day. In particular, the data misappropriation identification system is an improvement over existing solutions to the accurate and efficient determination of misappropriation attempts within an electronic network, (i) with fewer steps to achieve the solution, thus reducing the amount of computing resources, such as processing resources, storage resources, network resources, and/or the like, that are being used; (ii) providing a more accurate solution to problem, thus reducing the number of resources required to remedy any errors made due to a less accurate solution (e.g., through the use of at least the user account misappropriation AI engine, user account database, and user account report(s)); (iii) removing manual input and waste from the implementation of the solution, thus improving speed and efficiency of the process and conserving computing resources (e.g., and also requiring less manual input for each data transmission to determine a misappropriation likelihood, at a first time and at a later time for feedback and control); (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for detecting user account misappropriation attempts using artificial intelligence (AI) in an electronic network 100, in accordance with an embodiment of the invention. As shown in FIG. 1A, the distributed computing environment 100 contemplated herein may include a system 130 (i.e., a data misappropriation identification system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236.

As shown and described herein, and as understood by a person of skill in the art, each of the components described herein for the exemplary artificial intelligence (AI) engine subsystem may additionally and/or alternatively be used for generating, training, and tuning a machine learning model (not shown herein, but may be alternatively shown as machine learning (ML) subsystem 200), including an adaptive machine learning model and/or an adaptive AI engine. Thus, and as shown herein, a similar ML subsystem 200 may comprise the same data acquisition engine 202, a data ingestion engine 210, a data pre-processing engine 216, a ML tuning engine 222, and an inference engine 236. Further, and as understood by a person of skill in the art, such a ML subsystem 200 may be used as a building block for an adaptive machine learning model, which may be configured to analyze the data described herein in a single-channel approach in a sequential order and at a continuous frequency. Thus, and as shown and described herein, the adaptive machine learning model and the adaptive AI engine may be continuously trained on newly received data (such as feedback data) and may continuously refine its determinations and predictions in determining misappropriation likelihoods.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., $C\_1$, $C\_2$ .... $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., $C\_1$, $C\_2$ .... $C\_n$ 238) live data 234 based on how similar they are to one another to solve exploratory challenges where little is known about the data, provide a description or label (e.g., $C\_1$, $C\_2$ .... $C\_n$ 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for detecting user account misappropriation attempts using artificial intelligence (AI) in an electronic network, in accordance with an embodiment of the disclosure. In some embodiments, a system (e.g., similar to one or more of the systems described herein with respect to FIGS. 1A-1C) may perform one or more of the steps of process flow 300. For example, a data misappropriation identification system (e.g., the system 130 described herein with respect to FIG. 1A-1C) may perform the steps of process 300. In some embodiments, an artificial intelligence engine (e.g., such as the AI engine shown in FIG. 2) may perform some or all of the steps described in process flow 300.

As shown in block 302, the process flow 300 may include a step of accessing a user account database, wherein the user account database comprises at least one user account data. In some embodiments, the data misappropriation identification system may access a user account database which may comprise at least one user account identifier, user account data (e.g., resource account data, resource storage account data, resource advance account data, resource transmission data, and/or the like). Further, and as described herein, the user account database may comprise resource transmission data such as historical resource transmission data (e.g., all the data regarding prior resource transmissions for each of the user account(s) of the user account database) and/or current resource transmission data (e.g., data regarding each of the current resource transmissions, including requests, denials, and allowed resource transmission requests, at the current time).

Additionally, and in some embodiments, the current resource transmission data and/or the historical resource transmission data may comprise at least one of a resource transmission recipient identifier (e.g., indicating a recipient resource account for the resource transmission); a resource transmission sender identifier (e.g., indicating a sending resource account for the resource transmission); a resource amount attribute; a resource transmission sender location identifier (e.g., a geolocation of the sender user at the time the resource transmission request is submitted); a resource transmission recipient location identifier (e.g., a geolocation of the recipient user at the time the resource transmission request is submitted); and/or a resource transmission channel attribute (e.g., via a distributed network such as a Zelle® network, via a hardcopy network such as via a check, via a payment instrument, and/or the like). In some embodiments, the resource transmission sender location identifier and/or the resource transmission recipient location identifier is based on at least one of a geolocation of a user associated with the user account or a historical geolocation data associated with the user account, whereby the historical geolocation data may be assessed by an AI engine, such as the user account misappropriation AI engine described herein, and used to determine a likely geolocation of either user (e.g., sender and/or recipient) at the time the resource transmission request was submitted. For instance, and where a user (e.g., sender and/or recipient) is usually at their residential address at particular time of day and particular days of the week, such as a Sunday at 3 PM, then the user account misappropriation AI engine may determine that if a resource transmission request is generated and submitted on a Sunday around 3 PM, then the user is likely at their residential address. However, and in some embodiments, the user account misappropriation AI engine may use the historical geographic data of the user to determine whether the user is acting abnormally in generating and submitting the resource transmission request, such as where the user is not at the expected geolocation. Thus, and in some embodiments, the user account misappropriation AI engine may accurately and efficiently determine abnormal actions of a user associated with a user account based on geolocation data and/or the like.

In some such embodiments, the geolocation data may be collected by the data misappropriation identification system based on receiving a geolocation identifier, such as an IP address, a cell phone tower address/identifier, a WiFi address, by satellite triangulation, and/or the like.

Further, and in some embodiments, the user account database may be operated, stored, and/or generated by the data misappropriation identification system itself (e.g., by collecting and tracking the user account data as it comes into contact with new user account data), by a client of the data misappropriation identification system (e.g., such as a financial institution client and/or other such entity concerned with determining potential misappropriation attempts of data transmission requests), or a manager of the data misappropriation identification system (which may also comprise a financial institution or other such entity). By way of non-limiting example, the user account database may be accessed by the data misappropriation identification system via a network (such as network 110 of FIG. 1A) when the user account database is stored external to the data misappropriation identification system and/or may be accessed internally within the data misappropriation identification system.

As shown in block 304, the process flow 300 may include the step of identifying a current data transmission associated with a user account, wherein the user account is associated with the user account database. In some embodiments, the data misappropriation identification system may identify a current data transmission associated with a user account of the user account database based on receiving data of the current data transmission at a time before allowing the current data transmission (e.g., receiving a current data transmission request). In some embodiments, a client of the data misappropriation identification system (such as a financial institution and/or the like) may transmit the current data transmission request and its associated data to the data misappropriation identification system over a network, such as network 110 of FIG. 1A in order to receive a determination of whether the current data transmission is likely a misappropriation and should be blocked and/or disallowed. In some embodiments, the data misappropriation identification system may be partnered with a client of the data misappropriation identification system to automatically receive, in parallel, the current resource transmission data (current resource transmission requests and associated data) to determine whether to allow or disallow the current resource transmission.

As shown in block 306, the process flow 300 may include the step of applying the current data transmission to a user account misappropriation AI engine. In some embodiments, the data misappropriation identification system may apply the current data transmission (e.g., the current data transmission request and its associated data) to the user account misappropriation AI engine for the user account misappropriation AI engine to determine whether the current data transmission is likely a misappropriation or not. The user account misappropriation AI engine may make such a determination based on prior training on the specific user account and other such, similar user accounts, and/or by following pre-determined parameters (such as an entity parameter, which is described in further detail below). Such a user account misappropriation AI engine may additionally and/or alternatively comprise an adaptive engine (adaptive AI engine) and/or may be an adaptive machine learning model, which are described in further detail herein.

As shown in block 308, the process flow 300 may include the step of determining, by the user account misappropriation AI engine, a misappropriation likelihood of the current data transmission. In some embodiments, the data misappropriation identification system may user the user account misappropriation AI engine to determine a misappropriation likelihood of the current data transmission such as by analyzing the data of the current data transmission (e.g., the resource transmission recipient identifier, the resource transmission sender identifier, the resource amount attribute, the resource transmission sender location identifier, the resource transmission recipient location identifier, the resource transmission channel attribute, and/or the like) to determine whether the current data transmission for the user account is normal or abnormal. In some embodiments, such a determination of the misappropriation likelihood may be based on the historical data of the user account, based on entity parameter(s), based on historical data of other similar user accounts, and/or the like. Thus, and as shown herein, the data misappropriation identification system—by way of the user account misappropriator AI engine—may determine whether a misappropriator of data from the current data transmission request is likely to occur if the current data transmission request is accepted or allowed. For instance, and where the current data transmission is a resource transmission, the data misappropriation identification system may be used to determine whether to allow the resource transmission from a user account to a recipient account based on the historical data of the user account and/or based on pre-determined parameters associated with the client of the data misappropriation identification system (e.g., the financial institution associated with the resource account for the resource transmission request).

As shown in block 310, the process flow 300 may include the step of generating a user account report based on the current data transmission and the misappropriation likelihood, the user account report comprising a user account identifier associated with the user account. In some embodiments, the data misappropriation identification system may generate a new user account report with the current data transmission and its associated data considered by the data misappropriation identification system and/or may update a previously generated user account report for the user account. In this manner, the data misappropriation identification system may dynamically generate and update a user account report each time a current data transmission is received or identified, and may use the generated or updated user account report for a variety of purposes. Such a variety of purposes may include, but is not limited to transmitting the user account report as an interface component (e.g., a data packet used to configure a graphical user interface on a user device) to a user device associated with the user account and/or a user device associated with an entity of the data misappropriation identification system (e.g., a manager of the data misappropriation identification system, a client of the data misappropriation identification system, and/or the like), a user account report to be input back into the user account misappropriation AI engine for further training, and/or the like.

As disclosed herein, the user account report may comprise at least one of and/or all of the following: the resource transmission recipient identifier; the resource transmission sender identifier; the resource amount attribute; the resource transmission sender location identifier; the resource transmission recipient location identifier; the frequency of resource transmissions attribute associated with the user account (e.g., the frequency by which the user account has generated and/or submitted data transmission requests, including resource transmission requests, historically); and/or the resource transmissions channel attributes (of each of the resource transmissions associated with the user account).

In some embodiments, the data misappropriation identification system may aggregate and format the data of the current data transmissions and the historical data transmissions (including the historical resource transmissions and the current resource transmissions) within the user account report in particular format, such that the user account misappropriation AI engine can accurately and efficiently determine which data to consider when determine whether a current data transmission has a high misappropriation likelihood.

As shown in block 312, the process flow 300 may include the step of generating, based on the misappropriation likelihood, a misappropriation attempt attribute for the current data transmission. In some embodiments, the data misappropriation identification system may generate—based on generating/determining the misappropriation likelihood-a misappropriation attempt attribute which may be linked and/or attached to the user account identifier for the user account (where the misappropriation likelihood is due to an abnormality of the user account, or the sender account) or the misappropriation attempt attribute may be linked and/or attached to a recipient user account (where the misappropriation likelihood is due to an abnormality of the recipient user account of the current data transmission). In this manner, the data misappropriation identification system may accurately track and tag user accounts when a misappropriation is likely, whereby such a tracking and tagging of this data will create a more efficient mechanism for determining future misappropriation attempts which may use the same user account(s) previously tagged as having a misappropriation attempt. Further, and in some embodiments, the tracking and tagging of the user accounts may allow a client and/or a manager of the data misappropriation identification system to later search and pull up the user account data associated with the tags and make a manual determination of whether a misappropriation did occur. Such data from a client and/or manager may also be input back to the user account misappropriation AI engine as feedback for further training of the user account misappropriation AI engine.

FIG. 4 illustrates a process flow 400 for generating a misappropriation attempt attribute for the current data transmission, in accordance with an embodiment of the disclosure. In some embodiments, a system (e.g., similar to one or more of the systems described herein with respect to FIGS. 1A-1C) may perform one or more of the steps of process flow 400. For example, a data misappropriation identification system (e.g., the system 130 described herein with respect to FIG. 1A-1C) may perform the steps of process 400. In some embodiments, an artificial intelligence engine (e.g., such as the AI engine shown in FIG. 2) may perform some or all of the steps described in process flow 400.

In some embodiments, and as shown in block 402, the process flow 400 may include the step of determining the misappropriation likelihood for the current data transmission, wherein the misappropriation likelihood comprises a misappropriation score. By way of non-limiting example, the data misappropriation identification system may determine and/or generate the misappropriation likelihood as a misappropriation score. In this manner, the data misappropriation identification system may generate a numerical and/or letter value of the misappropriation likelihood as the misappropriation score and then may compare the misappropriation score to a misappropriation attempt threshold.

In some embodiments, and as shown in block 404, the process flow 400 may include the step of identifying a misappropriation attempt threshold. By way of example, the misappropriation attempt threshold may be pre-determined by a client of the data misappropriation identification system (such as by a financial institution and/or other entity), a manager of the data misappropriation identification system, by the data misappropriation identification system itself (e.g., by the user account misappropriation AI engine determining the misappropriation score needed to be considered a likely misappropriation attempt).

In some embodiments, and as shown in block 406, the process flow 400 may include the step of generating a misappropriation attempt attribute for the current data transmission. By way of example, the data misappropriation identification system may generate a misappropriation attempt attribute (e.g., a positive or negative misappropriation attempt attribute) based on the misappropriation score meeting the misappropriation attempt threshold. Such embodiments and outcomes are described in further detail below.

In some embodiments, and as shown in block 408, the process flow 400 may include the generation—in an instance where the misappropriation score meets or exceeds the misappropriation attempt threshold—a positive misappropriation attempt attribute for the current data transmission. By way of example, the data misappropriation identification system may generate a positive misappropriation attempt attribute to be linked with the current data transmission and the user account identifier which indicates the current data transmission likely comprises a misappropriation attempt and should be flagged for any future use of the user account with the positive misappropriation attempt attribute. Additionally, and in some embodiments, where the misappropriation attempt only meets the misappropriation attempt threshold, but does not exceed it, the data misappropriation identification system may generate a minor positive misappropriation attempt attribute, which will indicate that the misappropriation attempt may have occurred or may have not occurred and may need further review before disallowing the current data transmission. However, and in some embodiments, the data misappropriation identification system may comprise a setting identifying that any meeting of the misappropriation attempt threshold by the misappropriation score should be considered an absolute bar for the current data transmission as it comprises a misappropriation attempt.

In some embodiments, and as shown in block 409, the process flow 400 may include the step of transmitting, based on the generation of the positive misappropriation attempt attribute, an updated authentication requirement to a user device associated with the current data transmission. By way of example, and upon determining that the current data transmission comprises a misappropriation attempt, the data misappropriation identification system may additionally determine that the user associated with the user account should input greater authentication credentials before allowing the current data transmission to occur. Thus, the data misappropriation identification system may transmit an updated authentication requirement and/or updated authentication requirements to a user device associated with the user account, which will request further input from the user. In some embodiments, the updated authentication requirements may comprise a facial recognition requirement, a physical characteristic requirement, a dual factor authentication requirement, a security question(s), and/or the like.

In some embodiments, and as shown in block 410, the process flow 400 may include the generation—in an instance where the misappropriation score is less than the misappropriation attempt threshold—a negative misappropriation attempt attribute for the current data transmission. For instance, the data misappropriation identification system may generate a negative misappropriation attempt attribute by determining that the misappropriation score does not meet or exceed the misappropriation attempt threshold. Such a negative misappropriation attempt attribute may indicate that there a misappropriation attempt has not been detected for the current data transmission and that the current data transmission may be allowed automatically.

Additionally, and/or alternatively, the data misappropriation identification system may update the user account report with the positive misappropriation attempt attribute, such that the user account has a tag and/or a flag on their user account report for the current data transmission.

In some embodiments, and as shown in block 412, the process flow 400 may include the step of updating, based on the misappropriation attempt attribute, the user account report with the misappropriation attempt attribute for the current data transmission. For example, the data misappropriation identification system may update—based on the misappropriation attempt attribute—the user account report for either the positive misappropriation attempt attribute and/or the negative misappropriation attempt attribute for each of the data transmissions associated with the user account (both historical and/or current). In this manner, the data misappropriation identification system may generate and update a holistic user account report with each of the attributes generated by the data misappropriation identification system for each of the data transmissions for the user account, whereby such a user account report may be used by the data misappropriation identification system to accurately train and update the user account misappropriation AI engine.

In some embodiments, and as shown in block 414, the process flow 400 may include the step of applying, based on updating the user account report, the user account report to the user account misappropriation AI engine. For instance, the data misappropriation identification system may apply the user account report to the user account misappropriation AI engine at each time the user account report is updated (either by the generation of the misappropriation attempt attribute(s) and/or by feedback from a client of the data misappropriation identification system or manager of the data misappropriation identification system). In this way, the user account misappropriation AI engine may be continuously trained and refined to more accurately determine future misappropriation attempts for future data transmissions.

FIG. 5 illustrates a process flow 500 for determining the misappropriation likelihood of the current data transmission, in accordance with an embodiment of the disclosure. In some embodiments, a system (e.g., similar to one or more of the systems described herein with respect to FIGS. 1A-1C) may perform one or more of the steps of process flow 500. For example, a data misappropriation identification system (e.g., the system 130 described herein with respect to FIG. 1A-1C) may perform the steps of process 500. In some embodiments, an artificial intelligence engine (e.g., such as the AI engine shown in FIG. 2) may perform some or all of the steps described in process flow 500.

In some embodiments, and as shown in block 502, the process flow 500 may include the step of identifying the current data transmission is associated with a new user account. By way of example, the data misappropriation identification system may identify a new user account identifier for the current data transmission (or the current resource transmission/current resource transmission request), whereby such a new user account identifier comprises an identifier not already in the user account database. Thus, the new user account identifier is associated with a new user account that has just been generated, identified, and/or used with respect to an entity associated with the data misappropriation identification system, such as a new user account created within a financial institution's network, and/or the like.

In some embodiments, and as shown in block 504, the process flow 500 may include the step of identifying at least one entity parameter, wherein the at least one entity parameter is associated with an entity associated with the user account. Further, the data misappropriation identification system may—based on the new user account identifier-determine and/or identify an entity associated with the new user account identifier (e.g., a financial institution and/or the like) and the entity's associated parameter(s) for what the entity considers to be indicators of a misappropriation attempt. For instance, and where a user account is new and not enough historical data has been collected to train the user account misappropriation AI engine, the data misappropriation identification system may use the at least one entity parameter (or entity rule(s)) to identify and/or determine the misappropriation likelihood for the current data transmission of the new user account.

In some embodiments, and as shown in block 506, the process flow 500 may include the step of comparing, by the user account misappropriation AI engine, the at least one entity parameter and the current data transmission. For example, the data misappropriation identification system may compare the at least one entity parameter and the current data transmission and its associated data to determine whether any and/or all of the at least on entity parameters are present. Where at least one of the entity parameter(s) are present (match data of the current data transmission), the data misappropriation identification system—via the user account misappropriation AI engine—may determine a misappropriation is likely for the current data transmission. However, and in some embodiments, the data misappropriation identification system may identify a plurality of entity parameters which must be met in order for a misappropriation to be determined as likely for the current data transmission. Such a plurality of entity parameters that must be met may be pre-determined by the entity associated with the entity parameters (e.g., a financial institution, and/or the like).

Additionally, and in some embodiments, the user account misappropriation AI engine may be trained with the at least one entity parameter(s) to determine potential misappropriation attempts and generate misappropriation likelihood(s) for future data transmissions, for both new user accounts (and new user account identifiers) and known user accounts (user account identifiers already within the user account database).

In some embodiments, and as shown in block 508, the process flow 500 may include the step of determining, based on the comparison of the at least one entity parameter and the current data transmission, the misappropriation likelihood of the current data transmission. For example, the data misappropriation identification system may determine—based on said comparison—the misappropriation likelihood of the current data transmission for the new user account, whereby the identification of data for the current data transmission that matches at least one of the entity parameters may lead to positive misappropriation likelihood (positive misappropriation attempt attribute being generated) or where the data of the current data transmission does not match any of the entity parameters may lead to a negative misappropriation likelihood (negative misappropriation attempt attribute being generated). Additionally, and as described above, the data misappropriation identification system may additionally require all of the entity parameters to be present in the data of the current data transmission for the generation of the positive misappropriation likelihood.

FIG. 6 illustrates a process flow 600 for transmitting the misappropriation likelihood interface component to a user device, in accordance with an embodiment of the disclosure. In some embodiments, a system (e.g., similar to one or more of the systems described herein with respect to FIGS. 1A-1C) may perform one or more of the steps of process flow 600. For example, a data misappropriation identification system (e.g., the system 130 described herein with respect to FIG. 1A-1C) may perform the steps of process 600. In some embodiments, an artificial intelligence engine (e.g., such as the AI engine shown in FIG. 2) may perform some or all of the steps described in process flow 600.

In some embodiments, and as shown in block 602, the process flow 600 may include the step of generating—based on the misappropriation likelihood—a misappropriation likelihood interface component comprising the misappropriation likelihood, the current data transmission, and the user account identifier. For example, the data misappropriation identification system may generate—based on the misappropriation likelihood (such as the misappropriation likelihood generated in block 312)—the misappropriation likelihood interface component which may be transmitted to a user device as a data packet which may be used by the receiving user device to automatically configure the graphical user interface (GUI) of the user device to show the data of the misappropriation likelihood. In some embodiments, the misappropriation likelihood interface component may comprise the reasoning by the user account misappropriation AI engine in generating the misappropriation likelihood, including the data considered and/or analyzed.

In some embodiments, and as shown in block 604, the process flow 600 may include the step of transmitting the misappropriation likelihood interface component to a user device associated with the user account, wherein the misappropriation likelihood interface component configures a graphical user interface (GUI) of the user device. For example, the data misappropriation identification system may transmit the misappropriation likelihood interface component to the user device associated with the user account, whereby the user device may be a user device associated with the entity of the data misappropriation identification system (e.g., a client of the data misappropriation identification system such as financial institution and its associated user device, a manager of the data misappropriation identification system, and/or the like) and/or a user device associated with the user account of the current data transmission (e.g., such as mobile device associated with the user of the user account, a desktop associated with the user of the user account, a tablet associated with the user of the user account, and/or the like).

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for detecting user account misappropriation attempts using artificial intelligence (AI) in an electronic network, the system comprising:

a memory device with computer-readable program code stored thereon;

at least one processing device, wherein executing the computer-readable code is configured to cause the at least one processing device to perform the following operations:

access a user account database, wherein the user account database comprises at least one user account data;

identify a current data transmission associated with a user account, wherein the user account is associated with the user account database;

apply the current data transmission to a user account misappropriation AI engine;

determine, by the user account misappropriation AI engine, a misappropriation likelihood of the current data transmission;

generate a user account report based on the current data transmission and the misappropriation likelihood, the user account report comprising a user account identifier associated with the user account; and generate, based on the misappropriation likelihood, a misappropriation attempt attribute for the current data transmission.

2. The system of claim 1, wherein the computer-readable code is configured to cause the at least one processing device to perform the following operations:

determine the misappropriation likelihood for the current data transmission, wherein the misappropriation likelihood comprises a misappropriation score;

identify a misappropriation attempt threshold; and generate a misappropriation attempt attribute for the current data transmission, wherein, in an instance where the misappropriation score meets or exceeds the misappropriation attempt threshold, generate a positive misappropriation attempt attribute for the current data transmission, or wherein, in an instance where the misappropriation score is less than the misappropriation attempt threshold, generate a negative misappropriation attempt attribute for the current data transmission.

3. The system of claim 2, wherein the computer-readable code is configured to cause the at least one processing device to perform the following operations:

update, based on the misappropriation attempt attribute, the user account report with the misappropriation attempt attribute for the current data transmission; and apply, based on updating the user account report, the user account report to the user account misappropriation AI engine.

4. The system of claim 2, wherein the computer-readable code is configured to cause the at least one processing device to perform the following operation:

transmit, based on the generation of the positive misappropriation attempt attribute, an updated authentication requirement to a user device associated with the current data transmission.

5. The system of claim 1, wherein the user account data comprises at least one of a current resource transmission data or a historical resource transmission data.

6. The system of claim 5, wherein the current resource transmission data or the historical resource transmission data comprises at least one of a resource transmission recipient identifier, a resource transmission sender identifier, a resource amount attribute, a resource transmission sender location identifier, a resource transmission recipient location identifier, or a resource transmission channel attribute.

7. The system of claim 6, wherein the user account report comprises at least one of the resource transmission recipient identifier, the resource transmission sender identifier, the resource amount attribute, the resource transmission sender location identifier, the resource transmission recipient location identifier, a frequency of resource transmissions attribute associated with the user account, or a resource transmissions channel attributes.

8. The system of claim 6, wherein the resource transmission sender location identifier or the resource transmission recipient location identifier is based on at least one of a geolocation of a user associated with the user account or a historical geolocation data associated with the user account.

9. The system of claim 1, wherein the user account misappropriation AI engine comprises an adaptive engine.

10. The system of claim 1, wherein the computer-readable code is configured to cause the at least one processing device to perform the following operations:
- identify the current data transmission is associated with a new user account;
- identify at least one entity parameter, wherein the at least one entity parameter is associated with an entity associated with the user account;
- compare, by the user account misappropriation AI engine, the at least one entity parameter and the current data transmission; and
- determine, based on the comparison of the at least one entity parameter and the current data transmission, the misappropriation likelihood of the current data transmission.

11. The system of claim 1, wherein the computer-readable code is configured to cause the at least one processing device to perform the following operations:
- generate, based on the misappropriation likelihood, a misappropriation likelihood interface component comprising the misappropriation likelihood, the current data transmission, and the user account identifier; and
- transmit the misappropriation likelihood interface component to a user device associated with the user account, wherein the misappropriation likelihood interface component configures a graphical user interface of the user device.

12. A computer program product for detecting user account misappropriation attempts using artificial intelligence (AI) in an electronic network, wherein the computer program product comprises at least one non-transitory computer-readable medium having computer-readable program code portions embodied therein, the computer-readable program code portions which when executed by a processing device are configured to cause the processor to perform the following operations:
- access a user account database, wherein the user account database comprises at least one user account data;
- identify a current data transmission associated with a user account, wherein the user account is associated with the user account database;
- apply the current data transmission to a user account misappropriation AI engine;
- determine, by the user account misappropriation AI engine, a misappropriation likelihood of the current data transmission;
- generate a user account report based on the current data transmission and the misappropriation likelihood, the user account report comprising a user account identifier associated with the user account; and
- generate, based on the misappropriation likelihood, a misappropriation attempt attribute for the current data transmission.

13. The computer program product of claim 12, wherein the processing device is configured to cause the processor to perform the following operations:
- determine the misappropriation likelihood for the current data transmission, wherein the misappropriation likelihood comprises a misappropriation score;
- identify a misappropriation attempt threshold; and
- generate a misappropriation attempt attribute for the current data transmission,
  - wherein, in an instance where the misappropriation score meets or exceeds the misappropriation attempt threshold, generate a positive misappropriation attempt attribute for the current data transmission, or
  - wherein, in an instance where the misappropriation score is less than the misappropriation attempt threshold, generate a negative misappropriation attempt attribute for the current data transmission.

14. The computer program product of claim 13, wherein the processing device is configured to cause the processor to perform the following operations:
- update, based on the misappropriation attempt attribute, the user account report with the misappropriation attempt attribute for the current data transmission; and
- apply, based on updating the user account report, the user account report to the user account misappropriation AI engine.

15. The computer program product of claim 13, wherein the processing device is configured to cause the processor to perform the following operation:
- transmit, based on the generation of the positive misappropriation attempt attribute, an updated authentication requirement to a user device associated with the current data transmission.

16. The computer program product of claim 12, wherein the user account data comprises at least one of a current resource transmission data or a historical resource transmission data.

17. A computer implemented method for detecting user account misappropriation attempts using artificial intelligence (AI) in an electronic network, the computer implemented method comprising:
- accessing a user account database, wherein the user account database comprises at least one user account data;
- identifying a current data transmission associated with a user account, wherein the user account is associated with the user account database;
- applying the current data transmission to a user account misappropriation AI engine;
- determining, by the user account misappropriation AI engine, a misappropriation likelihood of the current data transmission;
- generating a user account report based on the current data transmission and the misappropriation likelihood, the user account report comprising a user account identifier associated with the user account; and
- generating, based on the misappropriation likelihood, a misappropriation attempt attribute for the current data transmission.

18. The computer implemented method of claim 17, the computer implemented method further comprising:
- determining the misappropriation likelihood for the current data transmission, wherein the misappropriation likelihood comprises a misappropriation score;

identifying a misappropriation attempt threshold; and
generating a misappropriation attempt attribute for the current data transmission,
  wherein, in an instance where the misappropriation score meets or exceeds the misappropriation attempt threshold, generating a positive misappropriation attempt attribute for the current data transmission, or
  wherein, in an instance where the misappropriation score is less than the misappropriation attempt threshold, generating a negative misappropriation attempt attribute for the current data transmission.

19. The computer implemented method of claim 18, the computer implemented method further comprising:
  updating, based on the misappropriation attempt attribute, the user account report with the misappropriation attempt attribute for the current data transmission; and
  applying, based on updating the user account report, the user account report to the user account misappropriation AI engine.

20. The computer implemented method of claim 18, the computer implemented method further comprising:
  transmitting, based on the generation of the positive misappropriation attempt attribute, an updated authentication requirement to a user device associated with the current data transmission.

* * * * *